United States Patent
Aoki

(10) Patent No.: US 7,065,348 B1
(45) Date of Patent: Jun. 20, 2006

(54) COMMUNICATION SYSTEM FOR PROVIDING INFORMATION ON POSITION OF COMMUNICATION PARTY

(75) Inventor: Hidehiko Aoki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 266 days.

(21) Appl. No.: 10/381,211

(22) PCT Filed: Sep. 28, 2000

(86) PCT No.: PCT/JP00/06717

§ 371 (c)(1),
(2), (4) Date: Aug. 13, 2003

(87) PCT Pub. No.: WO02/28137

PCT Pub. Date: Apr. 4, 2002

(51) Int. Cl.
*H04M 3/00* (2006.01)
*H04Q 7/20* (2006.01)
*H04B 7/185* (2006.01)
*G01L 9/00* (2006.01)
*G01L 9/16* (2006.01)

(52) U.S. Cl. .................. 455/419; 455/456.1; 455/457; 73/754; 342/356; 342/357.01; 342/357.06; 342/357.09

(58) Field of Classification Search ............ 455/456.2, 455/456.1, 457, 419; 342/357.01, 357.07, 342/357.06, 357.09, 356; 709/223; 73/754
See application file for complete search history.

(56) References Cited

U.S. PATENT DOCUMENTS

| | | | | |
|---|---|---|---|---|
| 4,445,118 A | * | 4/1984 | Taylor et al. | 342/357.09 |
| 5,528,248 A | * | 6/1996 | Steiner et al. | 342/357.06 |
| 5,689,809 A | * | 11/1997 | Grube et al. | 455/457 |
| 6,167,277 A | * | 12/2000 | Kawamoto | 455/457 |
| 6,229,477 B1 | * | 5/2001 | Chang et al. | 342/357.01 |
| 6,553,236 B1 | * | 4/2003 | Dunko et al. | 455/457 |
| 6,609,005 B1 | * | 8/2003 | Chern | 455/457 |
| 6,677,894 B1 | * | 1/2004 | Sheynblat et al. | 342/357.1 |
| 6,716,101 B1 | * | 4/2004 | Meadows et al. | 455/456.1 |
| 6,718,176 B1 | * | 4/2004 | Michaud et al. | 455/457 |
| 6,738,808 B1 | * | 5/2004 | Zellner et al. | 709/223 |
| 6,829,475 B1 | * | 12/2004 | Lee et al. | 455/419 |
| 6,868,733 B1 | * | 3/2005 | Ikezawa et al. | 73/754 |
| 6,876,858 B1 | * | 4/2005 | Duvall et al. | 455/456.1 |
| 2002/0183075 A1 | * | 12/2002 | Fauconnier | 455/456 |
| 2003/0134648 A1 | * | 7/2003 | Reed et al. | 455/456 |

FOREIGN PATENT DOCUMENTS

| | | |
|---|---|---|
| JP | 03-120995 | 5/1991 |
| JP | 10-094028 | 4/1998 |
| JP | 10-336725 | 12/1998 |

(Continued)

*Primary Examiner*—William D. Cumming
(74) *Attorney, Agent, or Firm*—Oblon, Spivak, McClelland, Maier & Neustadt, P.C.

(57) ABSTRACT

A method for providing location information. In the method a demand of providing location information of a terminal of a second user is accepted from a terminal of a first user. An approval of the location information provided to a terminal of the second user is requested, which depends on a request of providing the location information. A reply for approving providing the location information is received from the second terminal. Map information of the first and the second user which includes each other's location information is then generated, the location information which was provided from the first and second user's terminal is synthesized, and map data chosen based on the location information from the data base, when providing the location information, is approved. The generated map information is displayed at least on the first user's terminal.

6 Claims, 11 Drawing Sheets

FOREIGN PATENT DOCUMENTS

JP 11-239379 8/1999

WO WO 98/10538 * 3/1998

* cited by examiner

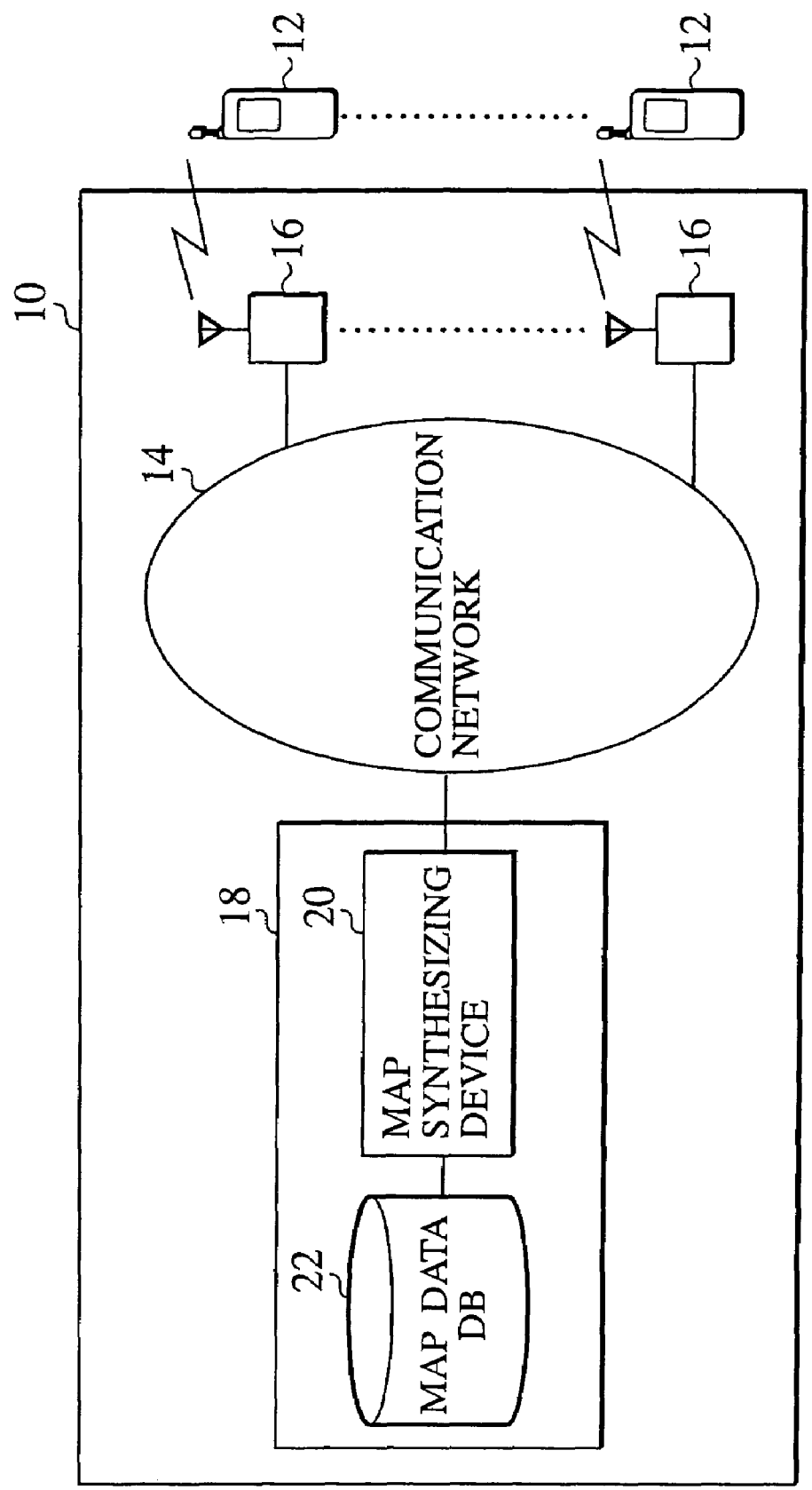

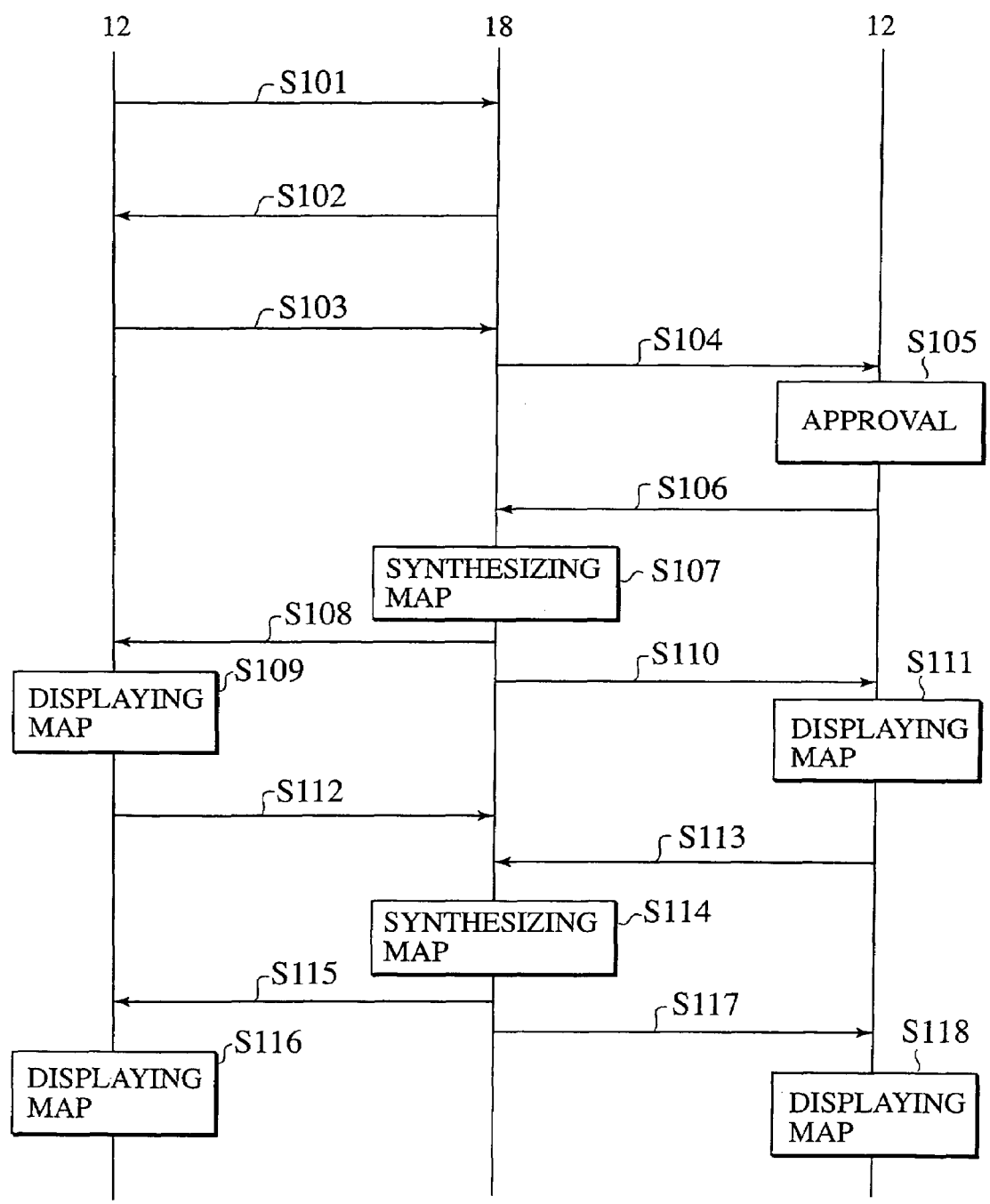

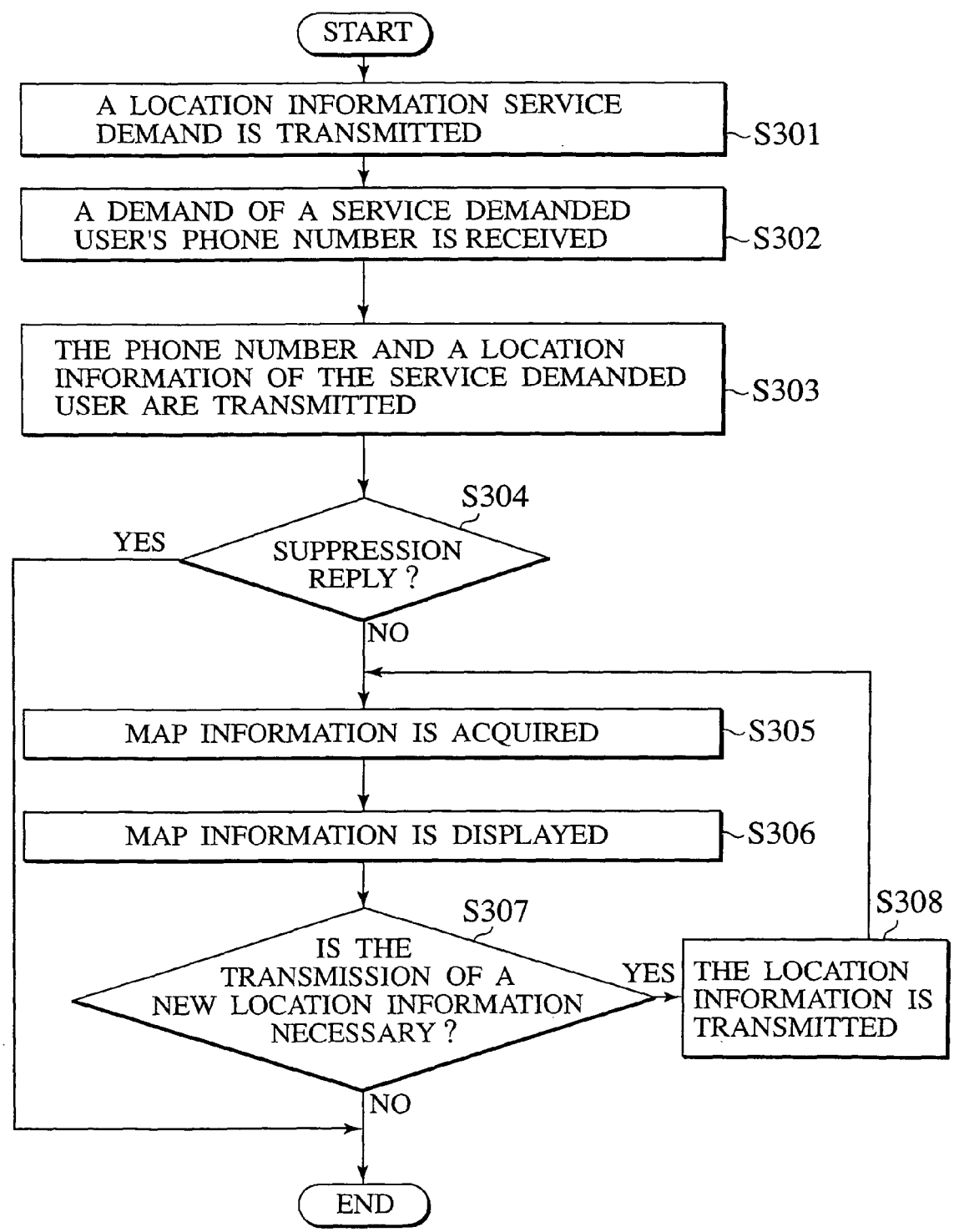

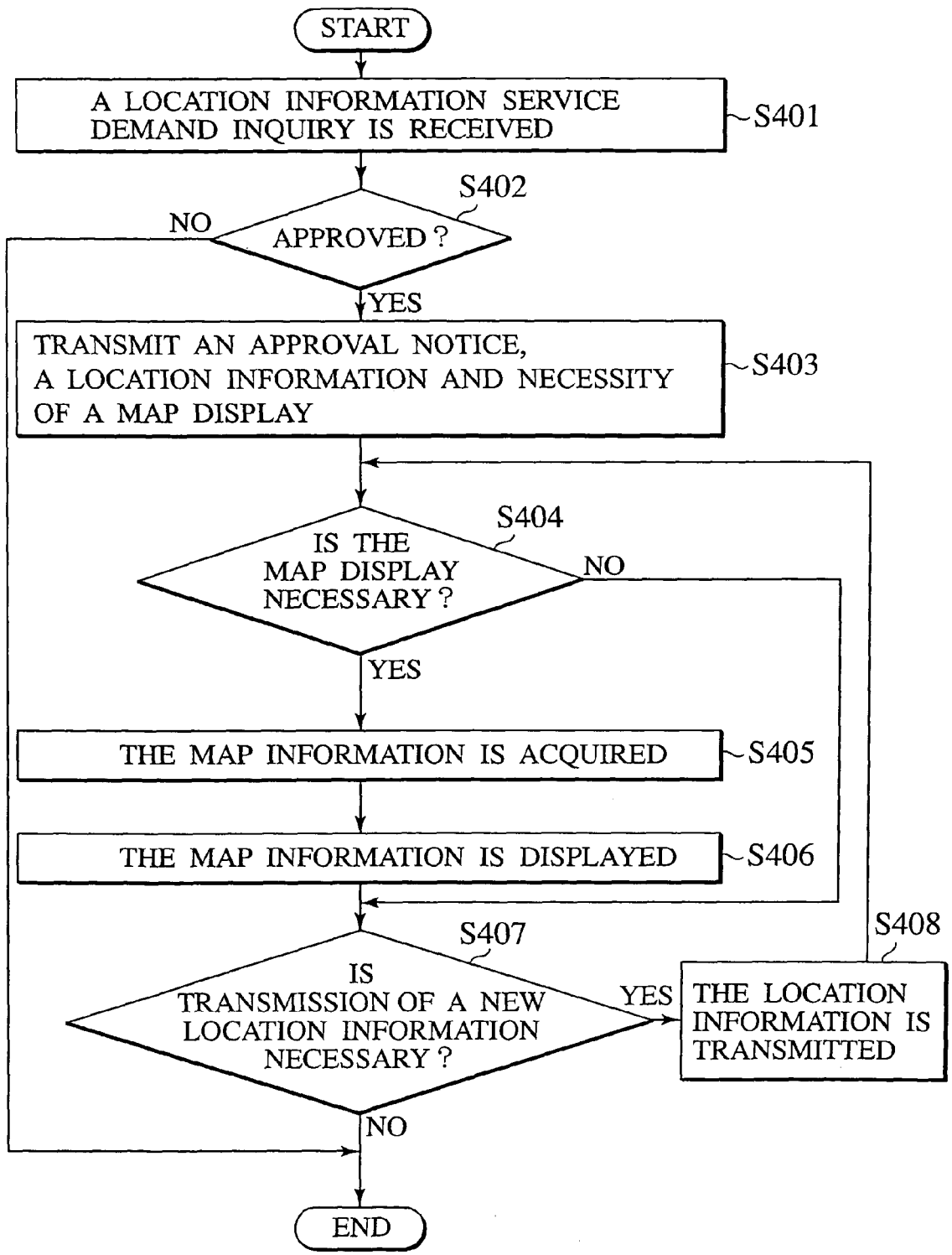

LOCATION INFORMATION SERVICE

PLEASE INPUT A CELLULAR PHONE NUMBER OF A PERSON THAT YOU WANT TO KNOW THE LOCATION

NUMBER : [        ]

[TO NEXT]

LOCATION INFORMATION SERVICE

[ 090-9876-5432 ]

A LOCATION OF THE PERSON IS UNIDENTIFIED

YOUR LOCATION : ◉
PERSON'S LOCATION : ◇

FIG.7D

LOCATION INFORMATION SERVICE 090-1234-5678

A PERSON OF THIS NUMBER WANTS TO KNOW YOUR PRESENT LOCATION. DISCLOSE THE LOCATION INFORMATION ?
IF YES IS SELECTED, YOUR LOCATION WILL BE TRANSMITTED TO THE PERSON OF THE NUMBER IN XX MINUTES FROM NOW

YES    NO

FIG.7E

LOCATION INFORMATION SERVICE 090-9876-5432

POSITION OF YOU AND THE PERSON CAN BE DISPLAYED ON YOUR SCREEN.
DISPLAY LOCATIONS ?

YES    NO

COMMUNICATION SYSTEM FOR PROVIDING INFORMATION ON POSITION OF COMMUNICATION PARTY

CROSS REFERENCE OF RELATED APPLICATIONS

This application is based upon and claims the benefit of priority from prior PCT Application PCT/JP00/06717 filed Sep. 28, 2000, the entire contents of which are incorporated herein by reference.

BACKGROUND OF THE INVENTION

Field of the Invention

The present invention relates to a communication system for providing location information depending on a demand of a user, of a mobile communication terminal such as a cellular phone, a PHS, a PDA and a PC.

In communication systems like a PHS, a service is available which will announce a users' terminal location between users of the communication only when a special contract is made in advance. However, it cannot be said that all users can use this service easily. In addition, location information of a user who participates in this special service is distributed only to another party, and is displayed on a map, via the Internet or a facsimile. Therefore, it cannot show a relative relation with respect to one's location and a location of another party. Accordingly, the system is insufficient for providing relative location information.

Furthermore, a facsimile and the Internet are communication devices that are mainly put in homes. When a user wants to use this service outside the home, the user must have access to devices which are most commonly found at home. Therefore, this service has severe limitations.

SUMMARY OF THE INVENTION

Thus, the aim of the present invention to provide a communication system which can solve the above problems.

According to a first aspect of the present invention, a communication system, comprises: (a) a database configured to store various map data which is synthesized location information of at least two terminals connected through a communication line; (b) a demand module configured to demand an approval from a first user to a second user, to provide the second user's location information; (c) a generating module configured to generate the first and the second user's map information which includes each user's location information, synthesizes the location information provided from the first and the second user's terminal, and map data which is chosen based on the location information from the database, when approval from the second user has been provided; and (d) a transmitting module configured to transmit the generated map information to at least the terminal of the first user.

According to a second aspect of the present invention, a communication system, further comprises: (a) a detecting module configured to detect a necessity of updating the first and the second user's location information; (b) an updating module configured to update the first and the second user's location information, when necessity of updating the location information is detected; wherein, (c) the generating module updates the map information by using the updated location information; and (d) the transmitting module transmits the updated map information to at least the first user's terminal.

According to a third aspect of the present invention, in a communication system, the transmitting module transmits the generated map information to the second user's terminal when the second user requires transmission of the generated map information.

According to a fourth aspect of the present invention, a communication system, further comprises a notifying module configured to notify an impossibility of providing the second user's location information to the first user's terminal when the second user does not approve of providing the position information.

According to a fifth aspect of the present invention, a communication system, comprises: (a) a database configured to store various map data to synthesize a terminal's location information of the terminal connected through a communication line to the database; (b) a demand module configured to demand an approval from a first user to a second user, to provide the second user's location information; and (c) a transmitting module configured to transmit location information provided from the terminal of the first and the second user; and map data chosen based on the location information from the database, which are necessary for the terminal to generate map information including the first and the second user's location information and transmit the information to the first and the second user's terminal, when the second user approves of providing the location information.

According to a sixth aspect of the present invention, a communication system, further comprises: (a) a detecting module configured to detect a necessity of updating the first and the second user's location information; and (b) an updating module configured to update the first and the second user's location information, when the necessity of updating the location information is detected; wherein, (c) the transmitting module configured to transmit the updated map information to the first and the second user's terminals.

According to a seventh aspect of the present invention, a communication system, further comprises a notifying module configured to notify an impossibility of providing the second user's location information to the first user's terminal, when the second user does not approve of providing the location information.

According to an eighth aspect of the present invention, a method for providing location information, comprises: (a) accepting a demand of providing location information of terminals of a second user from a first user; (b) requesting an approval of the location information providing to a terminal of a second user, which depends on a request of providing the location information; (c) receiving a reply for approving providing of the location information, from the second user's terminal; (d) generating map information of the first and the second user which includes each user's location information, synthesizing the location information which was provided from the first and the second user's terminal, and map data chosen based on the location information from the database, when providing of the location information is approved; and (e) displaying the generated map information at least on the first user's terminal.

According to a ninth aspect of the present invention, a method for providing location information, wherein (a) the accepting a demand of providing location information includes acquiring a demand of providing location information also accepts the first user's location information with the demand; and (b) the receiving a reply for approving providing of the location information includes acquiring a reply for approving providing the location information also includes acquiring the second user's location information with approval, when the second user approves the request of providing location information.

According to a tenth aspect of the present invention, a method for providing location information, after displaying the generated map information further comprises: (a) acquiring new location information of the first and the second user, when the first and the second user's request for updating location information is detected; (b) generating new map information, by using the location information which is newly acquired; and (c) displaying the new generated map information on the first and the second user's terminal.

According to an eleventh aspect of the present invention, in a method for providing location information, the request for updating location information is determined by whether a moving distance of the first and the second user surpasses predetermined value.

According to a twelfth aspect of the present invention, in a method for providing location information, the request for updating location information is detected at predetermined time intervals from a point of the second user' approval.

According to a thirteenth aspect of the present invention, a method for providing location information, further comprises, after receiving a reply for approving providing of the location information, impossibility of providing the location information of the second user is notified to the first user's terminal when the second user does not approve the providing the position information.

According to a fourteenth aspect of the present invention, a method for acquiring location information, comprises: (a) requesting to acquire location information of a terminal of another person; and (b) displaying, on one's terminal, map information which includes each location information of oneself and another person, which is generated by synthesizing location information transmitted from each terminal of oneself and another person and map data chosen based on the location information, when a request of the location information of another person is approved.

According to a fifteenth aspect of the present invention, a method for acquiring location information, wherein the one's location information is transmitted with the request for acquiring the location information, the transmission of the another person's location information is transmitted with approval, when the another person approves the request for acquiring the location information.

According to a sixteenth aspect of the present invention, a method for acquiring location information, comprises: (a) receiving a request to acquire one's location information by another person through a terminal; (b) determining whether the demand of the location information acquisition can be approved; and (c) displaying, on one's terminal, map information which includes each location information of oneself and the another person, which is generated by synthesizing location information transmitted from each terminal of oneself and the another person and map data which based on the location information, when the request of the location information acquisition is approved.

According to a seventeenth aspect of the present invention, in a method for acquiring location information, the another person's location information is transmitted with the request for acquiring the location information, the transmission of one's location information is transmitted with approval, when one approves the request for acquiring the location information.

According to a eighteenth aspect of the present invention, a memory storing a program for controlling a computer comprising a database for storing various map data synthesized a terminal's location information, connected through a communication line, and a providing the terminal's location information, the computer program comprising the instructions of: (a) accepting a request of providing location information of a terminal of a second user from a terminal of a first user; (b) requesting an approval of providing the location information to the second user's terminal, which depends on a request of providing the location information; (c) receiving a reply for approving providing of the location information from the second user's terminal; (d) generating map information of the first and the second user which includes each user's location information, synthesizing the location information which was provided from the first and the second user's terminal, and map data chosen based on the location information from the database, when providing of the location information is approved; and (e) displaying generated map information at least on the first user's terminal.

BRIEF DESCRIPTION OF THE DRAWINGS

FIG. 1 is a block diagram which shows a complete communication system, according to the first embodiment of the present invention.

FIG. 3 is an illustration which shows location information sequence of a communication system, according to the first embodiment of the present invention.

FIG. 5 is a flow chart which shows operation of a service demand user's terminal 12 in location information providing sequence, shown in FIG. 3.

FIG. 6 is a flow chart which shows operation of a service demanded user's terminal 12 in location information providing sequence, shown in FIG. 3.

FIGS. 7A through 7E are illustrations to show the screen image of a user's terminal 12, which the image is provided from location information service server 18.

DETAILED DESCRIPTION OF THE INVENTION

Figure 2A:
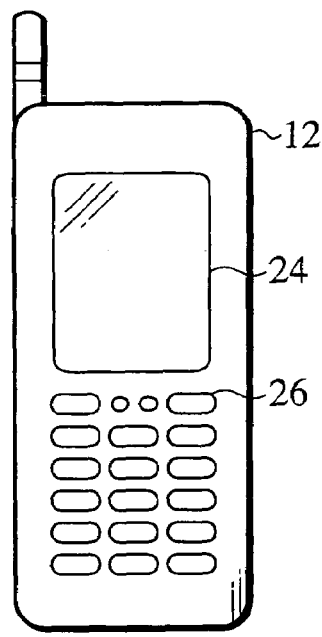
FIG. 2A is an illustration which shows the appearance of terminal 12 of FIG. 1.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc. to provide a through understanding of the present invention. However, it will be obvious to those skilled in the art that the present invention may be practiced without such specific details.

FIRST EMBODIMENT (1. Constitution)

(1.1 Constitution of the Whole System)

FIG. 1 is a block diagram which shows a complete communication system related to the first embodiment of the present invention. In FIG. 1, plural terminals 12 are connected to a telecommunication carrier 10.

Telecommunication carrier 10 provides connection service between plural terminals 12. The users subscribe to the carrier by contract prior to receiving the connection service.

Furthermore, when the telecommunication carrier 10 receives a request for the location information service from a user (the user is referred to as "a service demand user" in the following), the carrier 10 provides location information of other users (the other user is referred to as "a service demanded user" in the following) to the service demand user, when the service demanded user approves of providing the location information.

Telecommunication carrier 10 includes, for example; data communications network 14 which can packet transmission data; base station 16 which connects to data communications network 14 through radio-frequency transmission between each user's terminal 12; and location information service server 18 which manages the location information providing service.

The location information service server 18 comprises map synthesizing device 20 which prepares or composes location information which is sent by each terminal 12 and map data prepared in advance; and a map data database (map data DB) 22 which stores various map data.

The location information service server 18 includes, for example, general-purpose computers which are provided with a high-capacity memory device. This high-capacity memory device is, for example, a hard disk or a MO disk. One part of the storage area of this high-capacity memory device has the map data DB 22.

The location information service server 18 requests the approval of the location information providing service from the service demanded user when the service demand user asks for location information providing service.

In other words, the location information service server 18 confirms whether the service demanded user will be able to provide the service demanded user's location information to the service demand user. The server 18 can provide the service demanded user's location information to the service demand user when the service demanded user approves of providing such information.

Map synthesizing device 20 of location information service server 18 acquires each location information from each of service demand user's terminal 12 and the service demanded user. The device 20 specifies locations of a service demand user and a service demanded user based on the location information on map data which is registered in map data DB 22 in advance. Each synthesized location information like this, is brought back to the terminals of the service demand user and a service demanded user again. The map synthesizing device 20 can be provided by means of, for example, software and programs in hardware.

(1.2 Constitution of Terminal 12)

Firstly, terminal 12 is a portable radio terminal, such as a cellular phone, a PHS, a PC and a PDA, which comprises a radio communication function to connect to a base station 16 of telecommunication carrier 10. As shown in FIG. 2A, the surface of terminal 12 has a display unit 24 for displaying various kinds of information and input device 26 for inputting various kinds of instructions.

Furthermore, in the second, terminal 12 comprises location search function for detecting a present location of terminal 12.

Figure 2B:
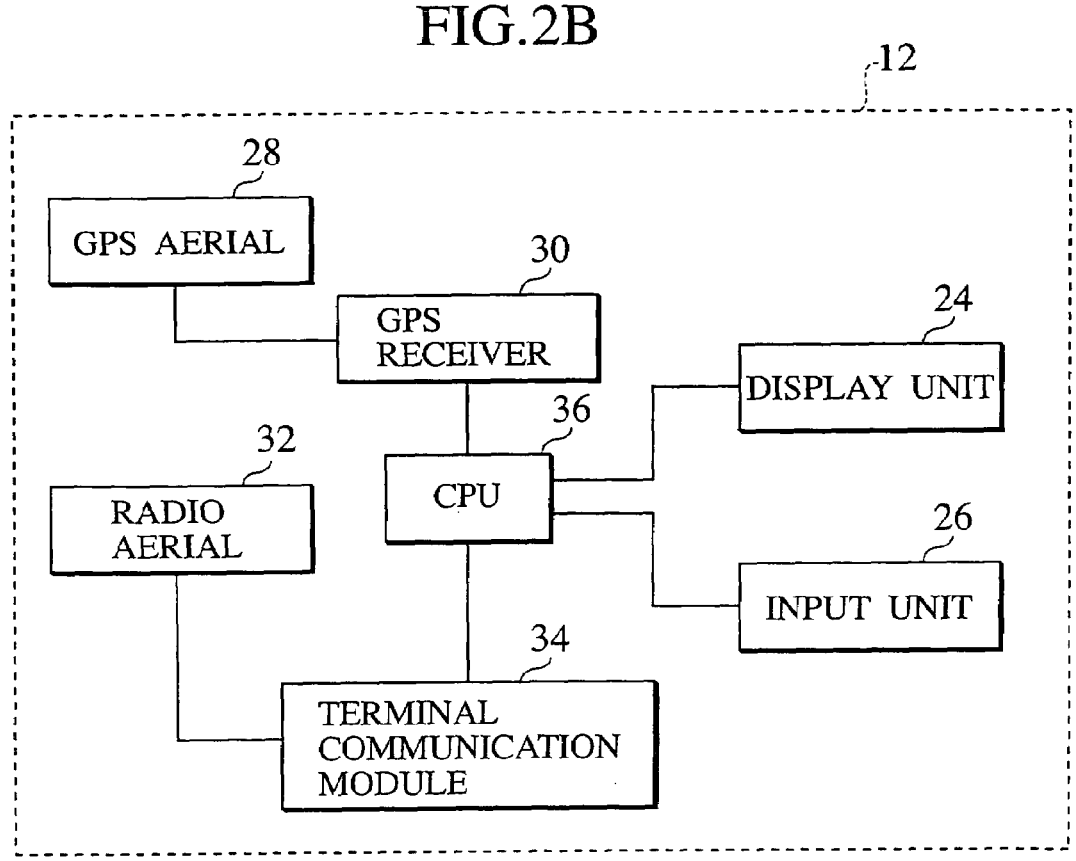
FIG. 2B is an illustration which shows elements of terminal 12 of FIG. 1.

This location search function is achieved, for example, by using the GPS (Global Positioning System) which can recognize a reception location precisely through a satellite signal detected by a plurality of man-made satellites. The measurement principle of the GPS is as follows; by measuring the delay time of a transmitted electric wave from plural GPS satellites which orbit around the earth, a present location of a movable body on the earth from orbit of a GPS satellite is calculated. By means of an electric wave, the distance between the three GPS satellites and the present location of the movable body on the earth is calculated, and the location of the movable body is determined. In addition, by measuring the distance between four GPS satellites and the present location of the movable body on the earth, a distance error caused by a GPS receiver clock's error, can be removed. By using this, correct latitude, longitude and altitude of the movable body's location on the earth can be determined. To achieve these radio communication functions and location search functions, terminal 12 comprises at least the elements shown in FIG. 2B.

In other words, terminal 12 comprises at least a GPS aerial 28 for receiving an electric wave from a GPS satellite; GPS receiver 30 for processing the signal which the GPS aerial 28 received; radio aerial 32 for transmitting and/or receiving data between base stations; terminal communications module 34 for modifying transmitted and/or received data through radio aerial 32; central processing unit (CPU) 36 for processing various information; display unit 24; and input unit 26. In CPU 36, order memory and data memory are usually provided. The order memory stores programs for achieving at least two functions, in short, a radio communication function and a location search function. The CPU 36 loads programs according to need, and executes the programs.

(2. Operation)

(2.1 Whole System Operation)

Next, description will be made for location information providing sequence of a communication system related to the first embodiment of the present invention, shown in FIG. 3a.

At first, when a service demand user's terminal 12 makes location information service request (step S101), the location information service server 18 requires the phone number of a service demanded user's terminal 12 to be provided by the service demand user (step S102). When a service demand user's terminal 12 receives the service demanded user's phone number, a phone number of a service demanded user's terminal 12 is transmitted to the location information service server 18. At this time, a service demand user's terminal 12 transmits location information which is provided by the installed GPS function 26,28 simultaneously (step S103).

When the information providing server 18 receives the phone number of the service demanded user's terminal 12 from the service demand user's terminal 12, the server 18 transmits the phone number of the service demand user's terminal 12 to the service demanded user's terminal 12, applies for determining whether the location information service request is accepted (step S104). At this time, the information service server 18 may transmit the service demand user's name instead of the phone number of the service demand user's terminal 12, because the service demanded user may not identify the service demand user only by the phone number.

When the service demanded user's terminal 12 receives an inquiry from the information service server 18, the service demanded user's terminal 12 confirms the phone number and/or the name of the received service demand user's terminal 12.

When the location information providing service is approved (step S105), the service demanded user's terminal 12 transmits an approval notice, location information and the necessity of a map display to the location information service server 18 (step S106). The location information of the service demanded user's terminal 12 was provided by the GPS function 26,28 which is installed in a service demanded user's terminal 12, as discussed above, same as the above location information of the service demand user's terminal 12. The necessity of a map display means whether the service demanded user's terminal 12 needs to display the map information which is provided by the location information service server 18. When a map display demand is transmitted, the location information service server 18 provides the map information.

Map synthesizing device 20 of the location information service server 18 comprises map information from a service demand user and location information which is received from a service demanded user's terminal 12 and map data which is stored in the map data DB 22, (step S107). Each terminal 12 transmits latitude, longitude and altitude of the location, which is provided by the GPS function, so as to provide location information. The map synthesizing device 20 selects map data in the map data DB 22, which includes latitude, longitude and altitude of both users' terminal. The map synthesizing device 20 generates map information for precisely displaying the locations of both users.

The location information service server 18 transmits the prepared map information to a service demand user's terminal 12 through map synthesizing device 20 (step S108), the service demand user's terminal 12 displays the map information on the display unit 24 of terminal 12 (step S109). The location information service server 18 also transmits map information to the service demanded user's terminal 12 which has transmitted the map display demand in step 106 (step S110). The service demanded user's terminal 12 which received map information, displays the map information on the display unit 24 of terminal 12 (step S111).

When the locations of the service demand user and the service demanded user change at a later time, the location information is provided again to the location information service server 18 (step S112, step S113). The location information service server 18 can collect this new location information from each terminal 12 in every limited time and each terminal 12 can also transmit the new information of the present location to the location information service server 18.

The map synthesizing device 20 of the location information service server 18 generates the new map information for displaying a service demand user's location and a service demanded user's location on the same map, the information based on each location information which is newly transmitted (step S114). The location information service server 18 again transmits synthesized map information to the service demand user's terminal 12 through map synthesizing device 20 (step S115). The service demand user's terminal 12 displays the map information in the display unit 24 of the terminal 12 (step S116). The location information service server 18 also transmits map information to a service demanded user's terminal 12 (step S117). The service demanded user's terminal 12 receives map information and displays the map information on display unit 24 of terminal 12 (step S118).

(2.2 Operation of Location Information Service Server 18)

Figure 4:
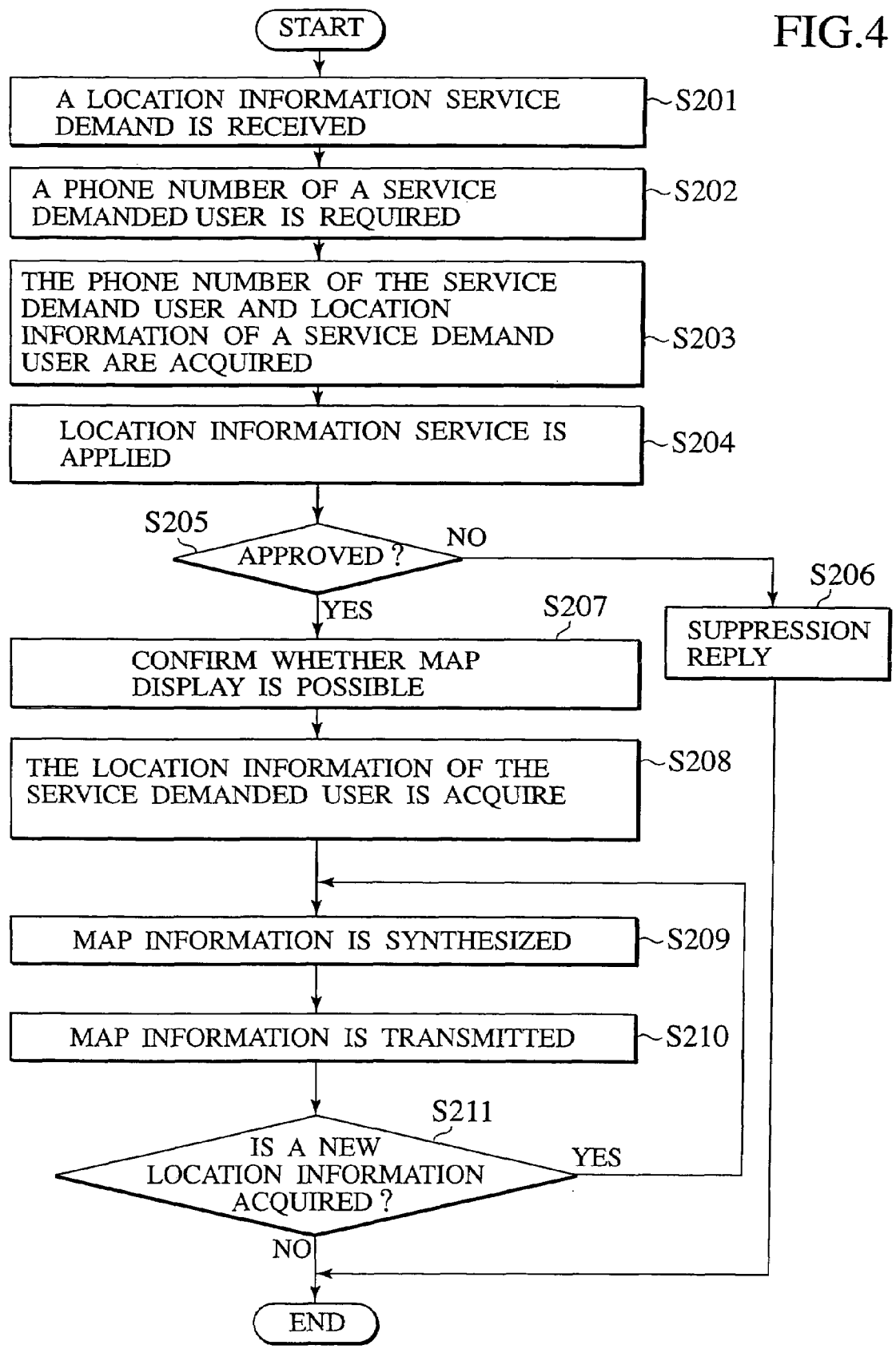
FIG. 4 is a flow chart which shows operation of location information service server 18 in location information providing sequence, shown in FIG. 3.

Next, operation of the location information service server 18, in location information providing sequence shown in FIG. 3, is explained. FIG. 4 is a flow chart which shows operation of the location information service server 18 in location information providing sequence shown in FIG. 3.

Firstly, as shown in FIG. 4, the server 18 receives location information service request from a service demand user's terminal 12 (step S201). The server 18 requires a phone number of the service demanded user's terminal 12 to a service demand user's terminal 12 (step S202). The server 18 also simultaneously requires location information of the service demand user's terminal 12.

When the server 18 receives the phone number of the service demanded user's terminal 12 and the location information of the service demand user's terminal from the service demand user's terminal 12 (step S203), the server 18 transmits the phone number and/or the name of a service demand user's terminal 12 to the service demanded user's terminal 12, for determining whether the location information service request is accepted (step S204). When a service demanded user does not approve the request (step S205), a suppression reply is transmitted to the service demand user's terminal 12 (step S206 NO) and this operation is completed.

On the other hand, when the service demanded user's terminal 12 approves the request (step S205 YES), location information service server 18 confirms the necessity of a map display to the service demanded user (step S207) and furthermore, acquires the location information of the service demanded user's terminal 12 (step S208).

The map synthesizing device 20 composes map information, which shows the location of the service demand user and the location of the service demanded user on the same map, from the location information which was received from each terminal 12 of the service demanded user and the service demand user, and map data in map data DB 22 (step S209). The server 18 transmits the synthesized map information to the service demand user's terminal 12 and also the service demanded user's terminal 12 which is offered the map display demand (step S210).

At least one of the service demand user's terminal 12 or the service demanded user's terminal 12 acquires a new location information (step S211 YES), and the operation returns to the step S209 again, and new map information is composed. For obtaining this new location information, for example, location information service server 18 can obtain the information from a service demand user's terminal 12 and a service demanded user's terminal 12 in a limited time. On the contrary, each terminal 12 can transmit the information to location information service server 18. When the service demand user's terminal 12 or the service demanded user's terminal 12 transmit a demand for cancellation of location information service, of course, further new location information will not be acquired. In addition, after starting of location information service, if the new location information is not acquired automatically in a limited time, the location information providing service can be completed. When the new location information is not acquired (step S211 NO), this operation is completed.

(2.3 Operation of terminal 12 of service demand user)

Next, operation of a service demand user's terminal 12 in location information providing sequence shown in FIG. 3 is described. FIG. 5 is a flow chart which shows operation of a service demand user's terminal 12 in location information providing sequence shown in FIG. 3.

In FIG. 5, when location information service request is transmitted to location information service server 18 (step S301), the location information service server 18 demands the transmission of a phone number of a service user's terminal 12 (step S302). At this time, service server 18 provides a screen image, for example shown in FIG. 7A, to the service demand user's terminal 12. Display unit 24 of terminal 12A displays the provided screen image.

Figures 7A, 7B, 7C:
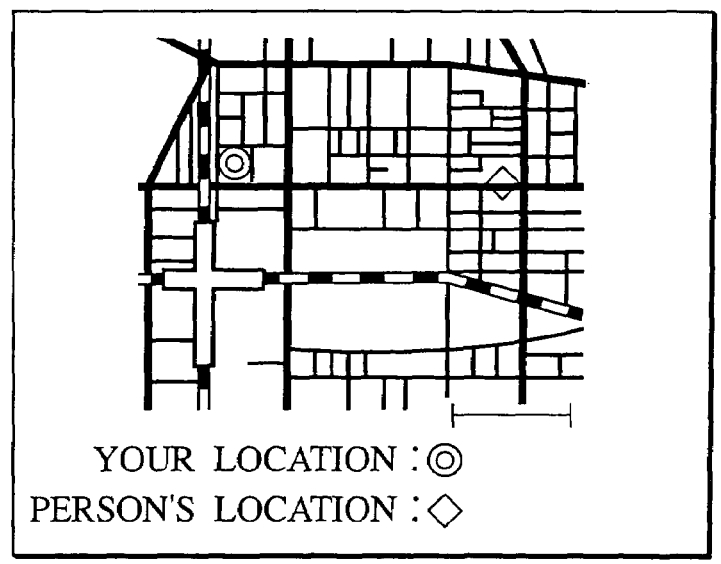

The service demand user inputs a phone number of a service demanded user's terminal 12, for example, on the screen image shown in FIG. 7A through input device 26. The terminal 12 transfers the input phone number to location information service server 18 (step S303). At this time, the terminal 12 also transfers the location information simultaneously to the server 18.

When the service demand user receives a suppression reply from the service demanded user through the location information service server 18 (step S304 YES), this operation is completed. At this time, location information service server 18 provides a screen image, for example, shown in FIG. 7B to terminal 12. Display unit 24 of terminal 12 displays the provided screen image. In addition, as shown in FIG. 7B, if a service demanded user does not approve the request, the suppression of the request does not need to be announced.

On the other hand, when a suppression reply is not transmitted (step S304 NO), location information service server 18 transmits map information which shows both locations, thus, the service demand user's terminal 12 and the service demanded user's terminal 12 receive the information (step S305). Display unit 24 of both terminals 12 displays the map information, for example as shown in FIG. 7C (step S306). This map information can express not only a present location which is displayed on each terminal 12, but also a reduced scale of the displayed map, a slant distance between each of the terminals 12, a direction, a running speed of user of each terminal 12, and an expected time until each of the terminals 12 meet, and so on. The various types of information are calculated based on location information which is provided by a GPS function which is installed in each of the terminal 12.

Furthermore, when transmission of new location information is necessary (step S307 YES), the service demand user's terminal 12 transmits a new location information to location information service server 18 (step S308), this operation can return to Step S305 again. On the other hand, when additional transmission of location information is unnecessary (step S307 NO), this sequence is completed.

(2.4 Operation of Terminal 12 of Service Demanded User)

Next, operation of a service demanded user's terminal 12 in location information providing sequence shown in FIG. 3 is explained. FIG. 6 is a flow chart which shows operation of a service demanded user's terminal 12 in location information providing sequence shown in FIG. 3.

At first, as shown in FIG. 6, a service demanded user's terminal 12 receives an inquiry of location information service request from the location information service server 18 (step S401). At this time, location information service server 18 provides, for example, a screen image shown in FIG. 7D, to a service demanded user's terminal 12. The service demanded user's terminal 12A shows the provided screen image shown in FIG. 7D on display unit 24. The service demanded user inputs, for example, whether the user approves the location information service or not, into the screen image of FIG. 7D on display unit 24, through input device 26.

As shown in FIG. 7D, a phone number of the service demand user's terminal 12 appears in this screen image. The service demanded user specifies the service demand user by considering this phone number, and assesses whether the location information service should be approved. Therefore, a service demanded user does not need to approve location information service, for example, when the user does not want to tell the location to the specified service demand user. In FIG. 7D, only a phone number of the service demand user appears. Actually, however, it is difficult to specify a service demand user only by the phone number. Therefore, this location information service server 18 can show a service demand user's name as well as a phone number simultaneously.

And when the service demanded user does not approve (step S402 NO), this sequence is completed. On the other hand, when it is approved (step S402 YES), the service demanded user's terminal 12 transfers an approval notice to location information service server 18. Furthermore, the service demanded user's terminal 12 also transfers location information which is given by the GPS function 28,30 which is installed in terminal 12, and the necessity of a map display which shows map information, simultaneously. In the case of the transmission of the necessity of this map display, for example, location information service server 18 transfers a screen image shown in FIG. 7 to the terminal 18. If the necessity of map display demand (FIG. 7E YES) is transmitted, location information service server 18 provides map information which shows both the user's location and the service demand user's location. On the contrary, if the map display is unnecessary and this information is transmitted (FIG. 7E NO), the map information is not provided to the service demanded user's terminal 12.

If map display is necessary (step S404 YES), map information, which shows both the service demand user location and the service demanded user's location, is transmitted by the location information service server 18 (step S405). The map information is displayed, as shown in FIG. 7C, on display unit 24 of terminal 12 (step S406).

If the necessity of map display is transmitted (step S404 YES), location information service server 18 transmits the map information for displaying both locations of the service demand user and the service demanded user (step S405). Display unit 24 of terminal 12 shows map information as shown in FIG. 7C FIG. 7C. On the other hand, if the map display is unnecessary and this information is transmitted (step S404 NO), and step S405 and step S406 are not executed.

Furthermore, if the transmission of new location information is necessary (step S407 YES), the service demanded user's terminal 12 transmits the new location information to location information service server 18 (step S408) and returns to Step S404 again. On the other hand, if the transmission of location information is no longer necessary (step S407 NO), this sequence is completed.

SECOND EMBODIMENT

Next, description will be made for the second embodiment of the present invention. In the first embodiment, location information service server 18 of telecommunication carrier 10 generates map information to a service demanded user's terminal 12 and a service demand user's terminal 12. In the second embodiment, on the other hand, each terminal 12 synthesizes each location information and map data, and generates map information.

Figure 8:
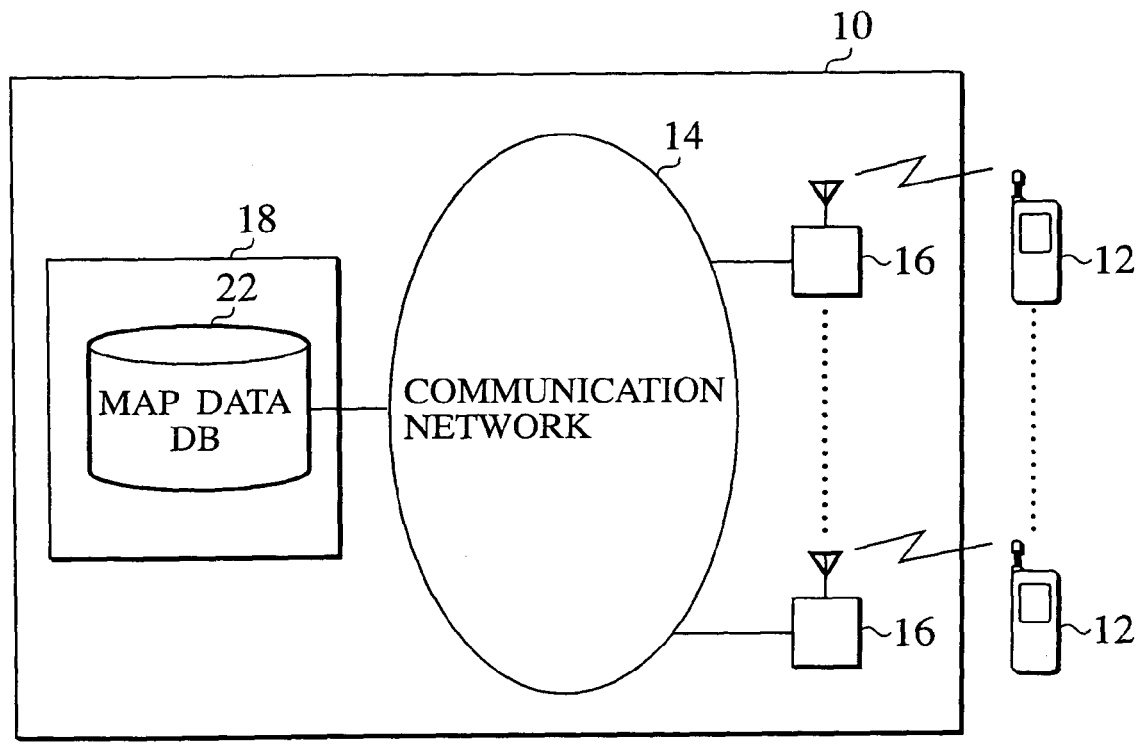
FIG. 8 is a block diagram which shows a complete communication system, according to the second embodiment of the present invention.

FIG. 8 is a block diagram which shows all elements of a communication system related to the second embodiment of the present invention. In FIG. 8, telecommunication carrier 10 connects to plural terminals 12 the same as in the first embodiment.

Terminals 12, related to the second embodiment of the present invention, comprise a map synthesizing module for composing map information from the map data which are transmitted by location information service server 18, and each location information of a service demand user's terminal 12 and a service demanded user's terminal 12. In other words, terminals 12, related to the second embodiment, are preinstalled with map synthesizing programs for providing a function which is the same as the map synthesizing device 20 of the first embodiment. For example, order memory, installed in the CPU 36 of FIG. 2B, stores the map synthesizing program.

When a service demand user's terminal 12, related to the second embodiment of the present invention, receives location information of a service demanded user's terminal 12 and map data from location information service server 18, the CPU 36 executes a map composing program stored in terminal 12. The map composing program is executed for composing map information from location information of a received service demanded user's terminal 12, map data and location information of a service demand user's terminal 12. If location information service server 18 transmits map data, the terminals receive the data as vector data and a great many variations of map information are modified in terminals 12. Vector data expresses map data as a physical relationship like a road or a building, not as a picture. A size of map information can be changed to adapt to a size of a display unit 24 display area of each terminal 12. A part of the map information can zoom freely. Only a road image or a image which includes buildings can be displayed. These functions are equally provided in a service demanded user's terminal 12.

In the first embodiment, only location information service server 18 of telecommunication carrier 10 generates map information in the synthesizing.

In the second embodiment, only a service demand user's terminal 12 and a service demanded user generates map information in the synthesizing. However, the present invention is not limited in these defined arrangements and synthesizing. For example, only one of the service demand user's terminal 12 or the service demanded user's terminal 12 can have a map information generation function. In this case, the other terminal 12 which does not have this generation function, requires map information from the location information service server 18.

THIRD EMBODIMENT

Figure 9:
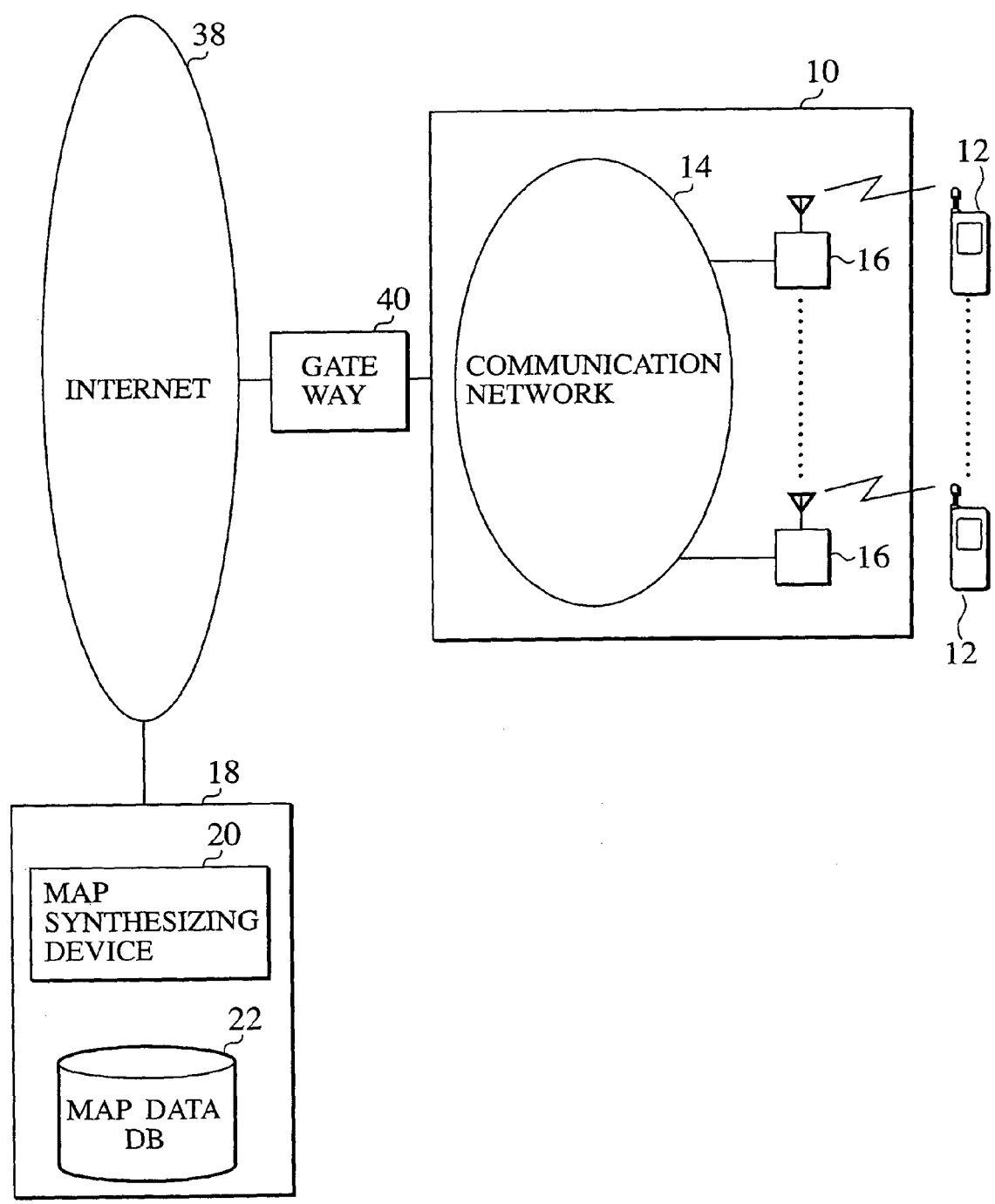
FIG. 9 is a block diagram which shows a complete communication system, according to the third embodiment of the present invention.

Next, description will be made for the third embodiment of the present invention. FIG. 9 is a block diagram which shows elements of a communication system related to the third embodiment of the present invention. In the first and the second embodiment, location information service server 18 was provided in the telecommunication carrier 10 which provides connection service between user's terminals 12. In other words, they are examples that telecommunication carrier 10 executes location information providing service. In the third embodiment, instead of telecommunication carrier 10, a service provider that manages location information service server 18 and connects to an open computer network 38 like the Internet to execute location information providing service is described.

In FIG. 9, plural terminals 12 connect to telecommunication carrier 10 the same as in the first and the second embodiments. Communication network 14 of telecommunication carrier 10 connects to the Internet 38 through, for example, gateway 40. Internet 38 connects to location information service server 18 which is managed by a service provider. Of course, the present invention can apply to various computer networks, not only the Internet, for example, also a satellite network or a radio network.

Each user of terminal 12 contracts with a provider of location information, in advance. At this point, each user registers a phone number of each terminal 12 as a service user. Because of the registration, this service provider can provide the location information providing service, the same as telecommunication carrier 10 of the first and the second embodiments.

In addition, this service provider can collect necessary information for the contract, such as a name, an address, an occupation, and also personal information such as a nickname, a hobby, and one's birthday, from each user. In this case, a service demand user can give this personal information to the service demanded user who requests his/her location information.

It can be determined in advance as to what kind of personal information is provided to what kind of user. This can provide service for users to be more interesting and useful.

OTHER EMBODIMENTS

Now, explanations have been made for the above embodiments of the present invention. These embodiments do not limit on the technical scope of the invention related to this application. Various modifications will become possible for those skilled in the art after receiving the teachings of the present disclosure without departing from the scope thereof. The present disclosure is therefore to be considered illustrative and not restrictive, the scope of the present invention being indicated by the appended claims rather than by the foregoing description, and all changes which come within the meaning and range of equivalency of the claims are therefore intended to be embraced therein.

Figure 10:
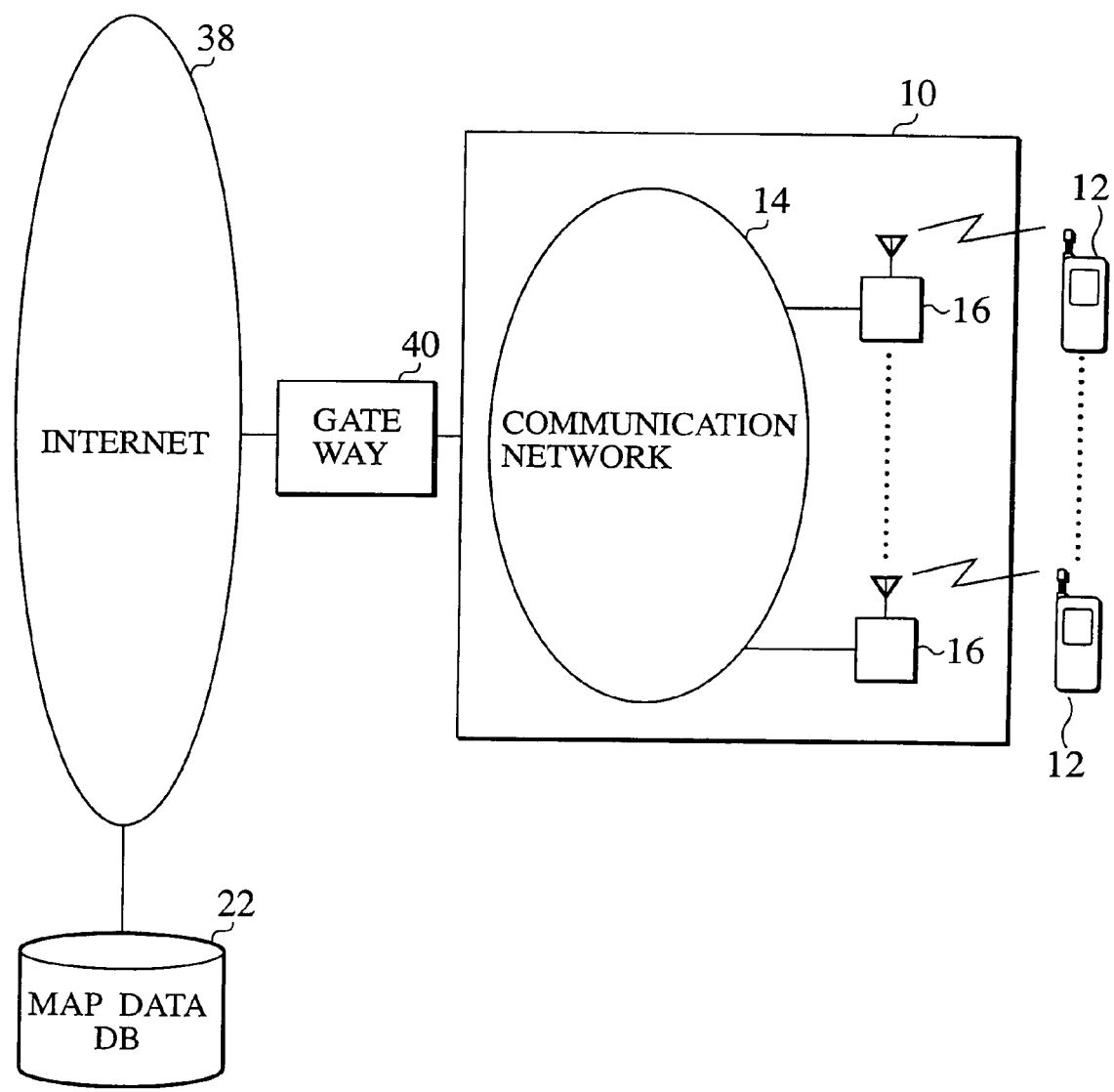
FIG. 10 is a block diagram which shows a complete communication system related to the fourth embodiment of the present invention.

For example, as shown in FIG. 10, in the third embodiment, terminal 12 can be implemented so as to compose map information in the same manner as the second embodiment. In FIG. 10, map data DB 22 connects to Internet 38 directly, this map data DB 22 comprises not only a storage device for composing a database, but also a computer such as a server.

It is clear from description in the claims that such inventions are belonged to technical scope of the inventions related to this application.

INDUSTRIAL APPLICABILITY

As it is clear from the above-mentioned explanation, according to the present invention, location information only about the user who approves the request for such information, is provided to a third person. Therefore, the user's location can be prevented from being known to others against the user's intention. Convenience in communication of users will improve because one's location and one's contact person's location are displayed on the same map.

What is claimed is:

1. A method for providing location information, comprising:
   accepting a demand of providing location information of a terminal of a second user from a terminal of a first user;
   requesting an approval of the location information provided to the terminal of the second user, which depends on a request of providing the location information;
   receiving a reply for approving providing of the location information, from the second user's terminal;
   generating map information of the first and the second user which includes each user's location information, synthesizing the location information which was provided from the first and the second user's terminal, and map data chosen based on the location information from the database, when providing of the location information is approved;
   displaying the generated map information at least on the first user's terminal;
   acquiring new location information of the first and the second user, when the first and the second user's request for updating location information is detected;
   generating new map information, by using the location information which is newly acquired; and
   displaying the new generated map information on the first and the second user's terminal,
   wherein the accepting a demand of providing location information includes acquiring a demand of providing location information also accepts the first user's location information with the demand;
   the receiving a reply for approving providing of the location information includes acquiring a reply for approving providing the location information also includes acquiring the second user's location information with approval, when the second user approves the request of providing location information; and
   the request for updating location information is detected by whether a moving distance of the first and the second user surpasses a predetermined value.

2. The method of claim 1, further comprising, after receiving a reply for approving providing of the location information, notifying of an impossibility of providing the location information of the second user to the first user's terminal when the second user does not approve the providing the position information.

3. A method for providing location information, comprising:
   accepting a demand of providing location information of a terminal of a second user from a terminal of a first user;
   requesting an approval of the location information provided to the terminal of the second user, which depends on a request of providing the location information;
   receiving a reply for approving providing of the location information, from the second user's terminal;
   generating map information of the first and the second user which includes each user's location information, synthesizing the location information which was provided from the first and the second user's terminal, and map data chosen based on the location information from the database, when providing of the location information is approved;
   displaying the generated map information at least on the first user's terminal;
   acquiring new location information of the first and the second user, when the first and the second user's request for updating location information is detected;
   generating new map information, by using the location information which is newly acquired; and
   displaying the new generated map information on the first and the second user's terminal,
   wherein the accepting a demand of providing location information includes acquiring a demand of providing location information also accepts the first user's location information with the demand;
   the receiving a reply for approving providing of the location information includes acquiring a reply for approving providing the location information also includes acquiring the second user's location information with approval, when the second user approves the request of providing location information; and
   the request for updating location information is determined at predetermined time intervals from a point of the second user' approval.

4. The method of claim 3, further comprising, after receiving a reply for approving providing of the location information, notifying of an impossibility of providing the location information of the second user to the first user's terminal when the second user does not approve the providing the position information.

5. A method for providing a map service to terminals, comprising:
   receiving a service request from a first terminal, the service request being accompanied by a first phone number of the first terminal, a second phone number of the second terminal, and a first location information of the first terminal;
   transmitting the service request to a second terminal whether a user of the second terminal allows to provide a location information to a user of the first terminal;
   receiving an approval message from the second terminal, the approval message being accompanied by a second location information of the second terminal;
   generating a map data showing both positions of the first and second terminals using the first and second location informations; and
   transmitting the map data at least to the first terminal to be displayed.

6. A server for providing a map service to radio terminals, comprising:
   a database storing a map data;
   a communication module configured to communicate directly or indirectly with radio terminals, the radio terminals including at least a first radio terminal being assigned a first phone number and having a sensor to generate a first location information indicating the location of the first radio terminal, and a second radio terminal being assigned a second phone number and having a sensor to generate a second location information indicating the location of the second radio terminal;
   a processing unit configured to control the data base and the communication module and to provide the map service, wherein the processing unit includes:
      a receiving unit configured to receive a service request from a first radio terminal via the communication module, the service request being accompanied by the first phone number of the first radio terminal, the second phone number of the second radio terminal, and the first location information of the first radio terminal;

a transmitting unit configured to transmit the service request to the second radio terminal whether a user of the second radio terminal allows to provide the second location information to a user of the first radio terminal, via the communication module, wherein the service request is accompanied with the first telephone number or a user name of the first radio terminal;

a message receiving unit configured to receive an approval message from the second radio terminal, the approval message being accompanied by the second location information of the second radio terminal, via the communication module;

a map synthesizing unit configured to synthesize a map data showing both positions of the first and second radio terminals with the first and second location informations, using the database; and a distributing unit configured to distribute the map data at least to the first radio terminal to be displayed, via the communication module.

* * * * *